Feb. 28, 1967 LE ROY R. BOGGS 3,306,797
METHOD AND APPARATUS FOR MAKING ELONGATED ARTICLES
OF FIBER REINFORCED RESIN MATERIAL
Filed Aug. 2, 1963 11 Sheets-Sheet 1
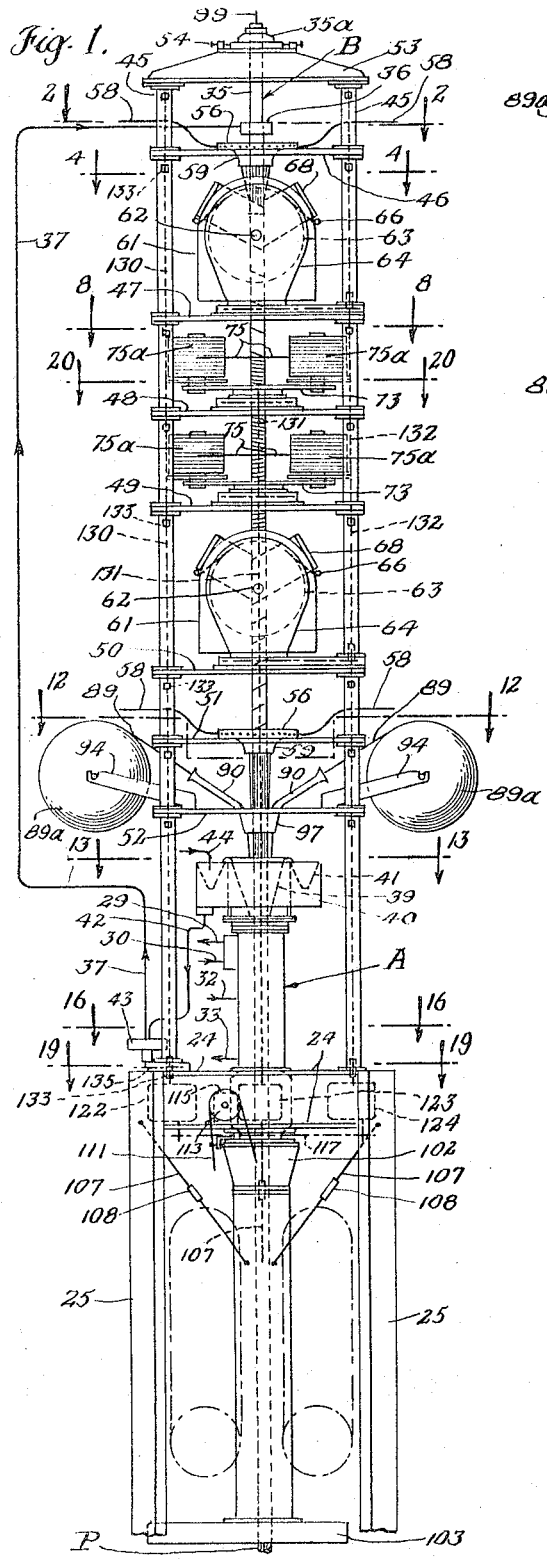
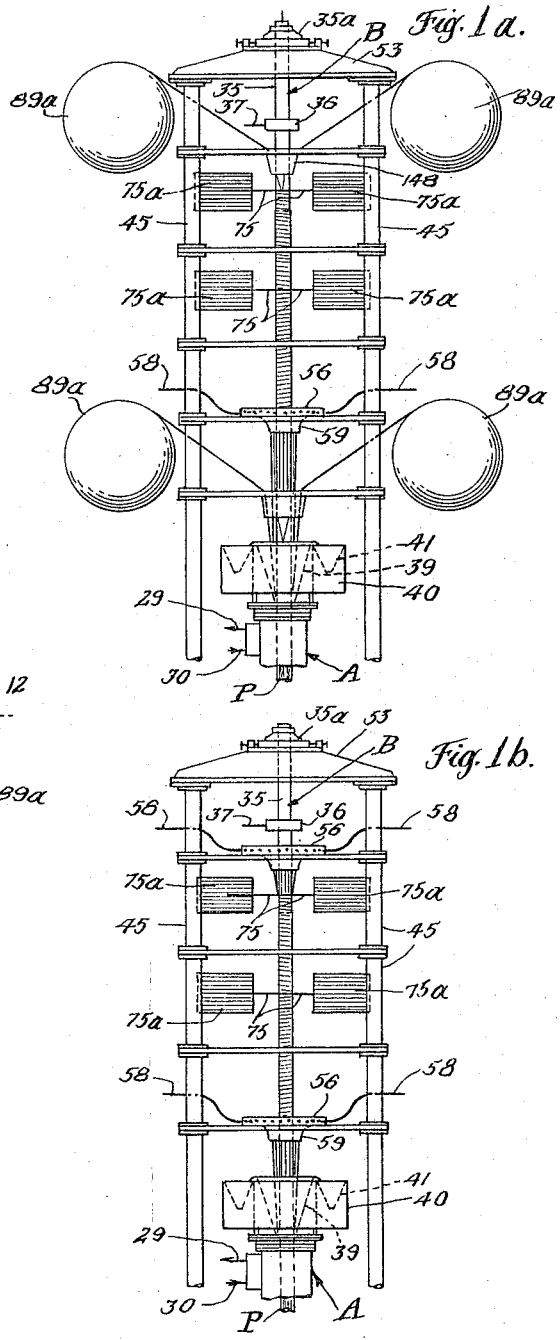
INVENTOR
Le Roy R. Boggs
BY
ATTORNEYS INVENTOR.
Le Roy R. Boggs
BY
ATTORNEYS

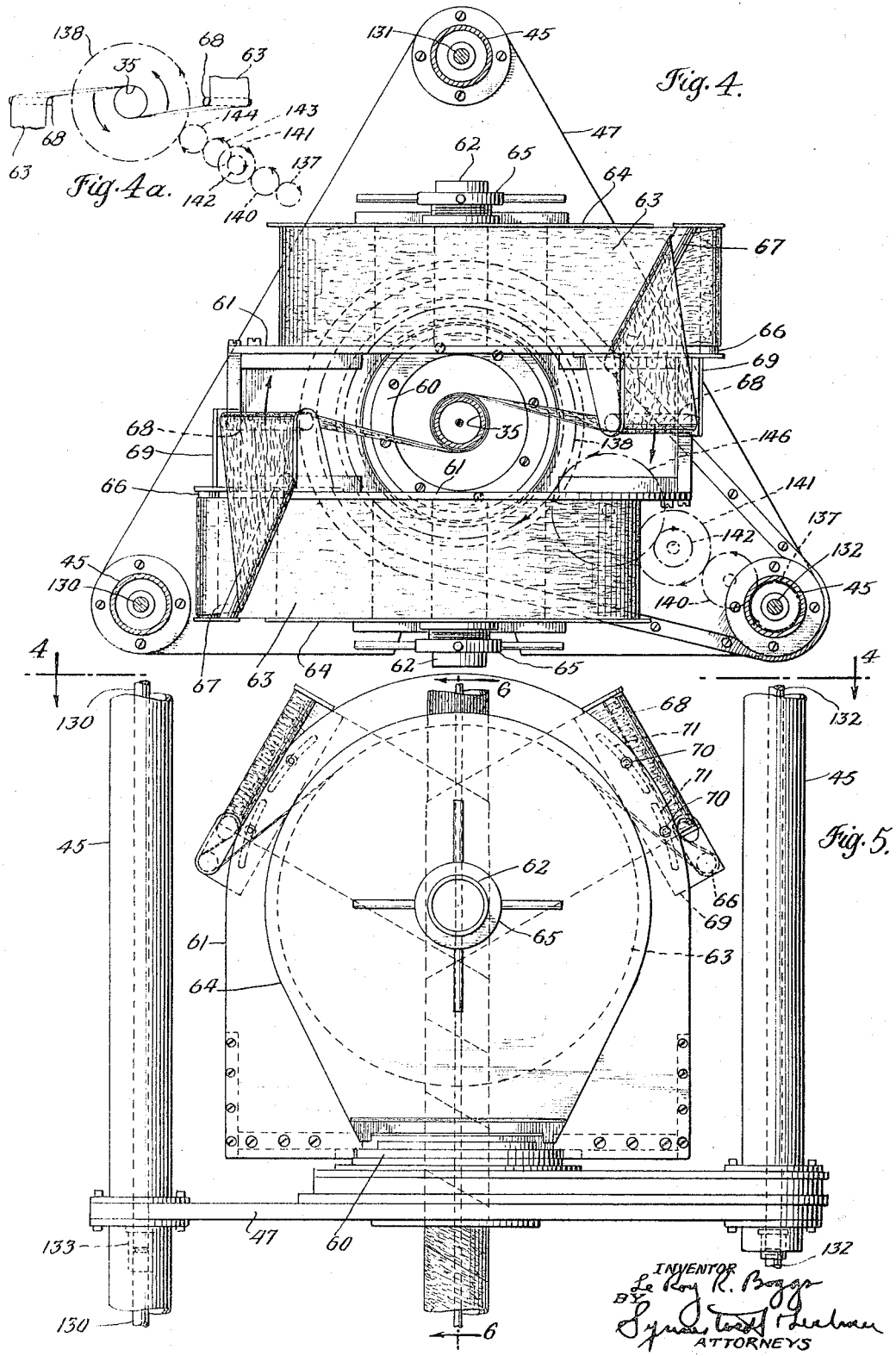

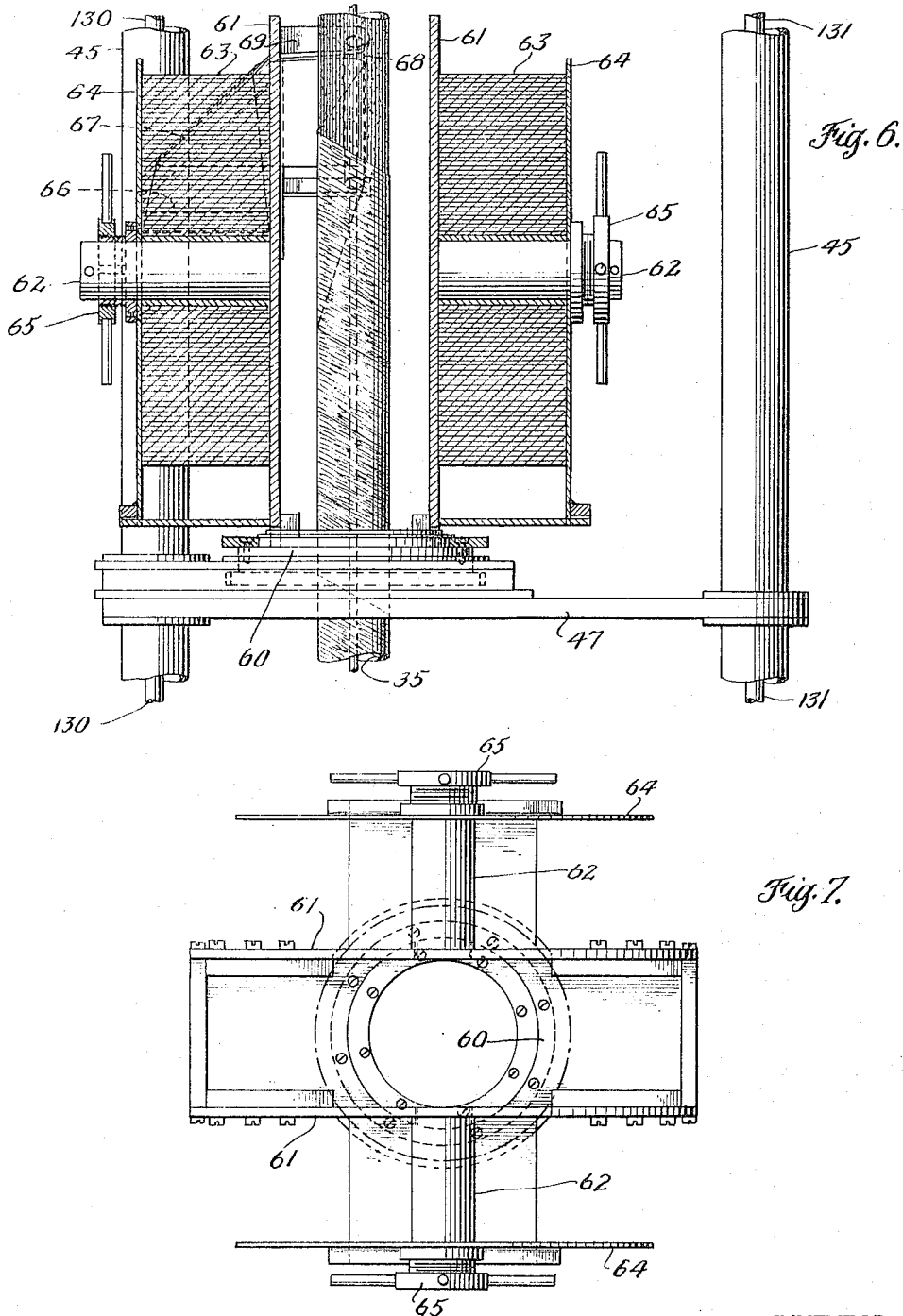

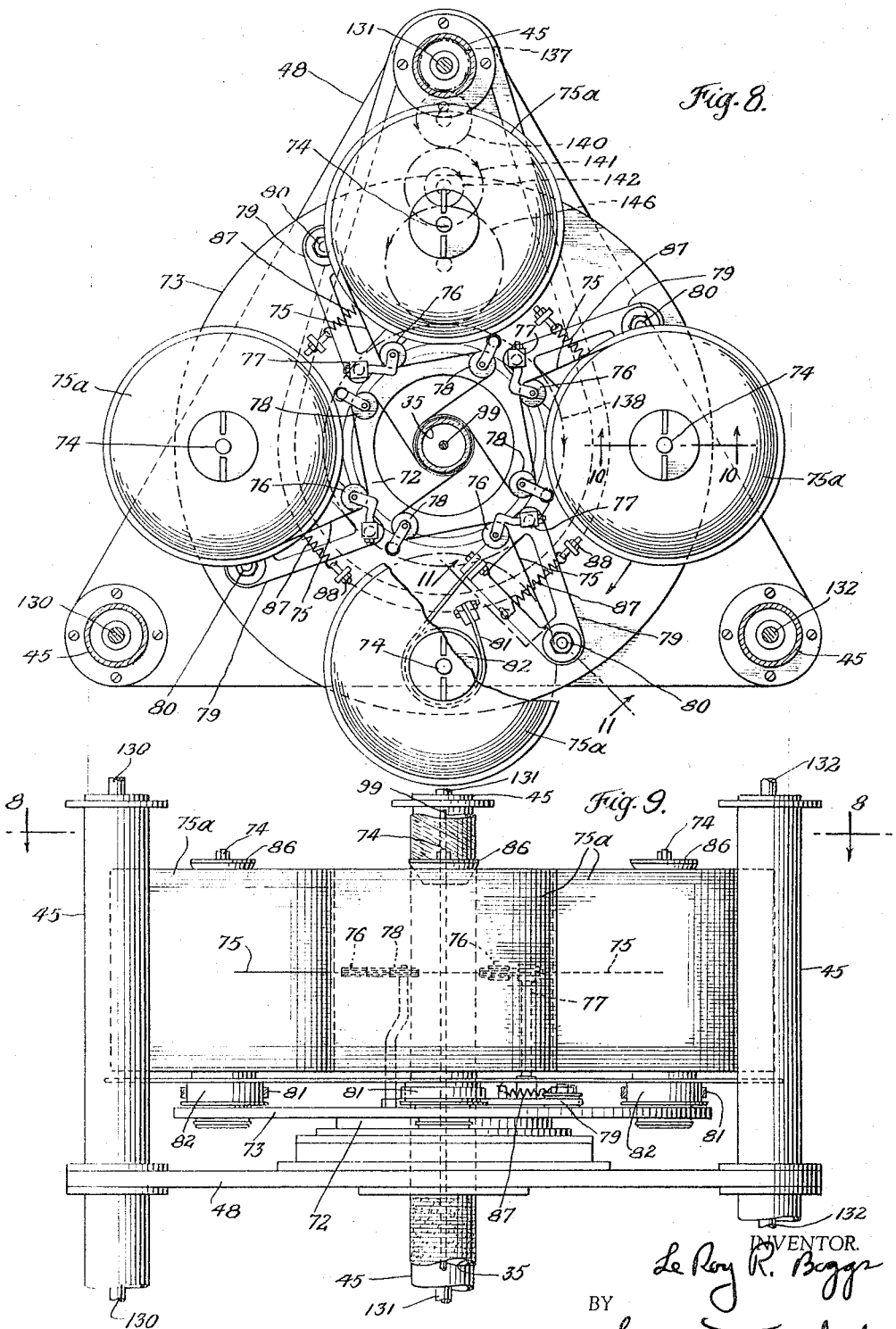

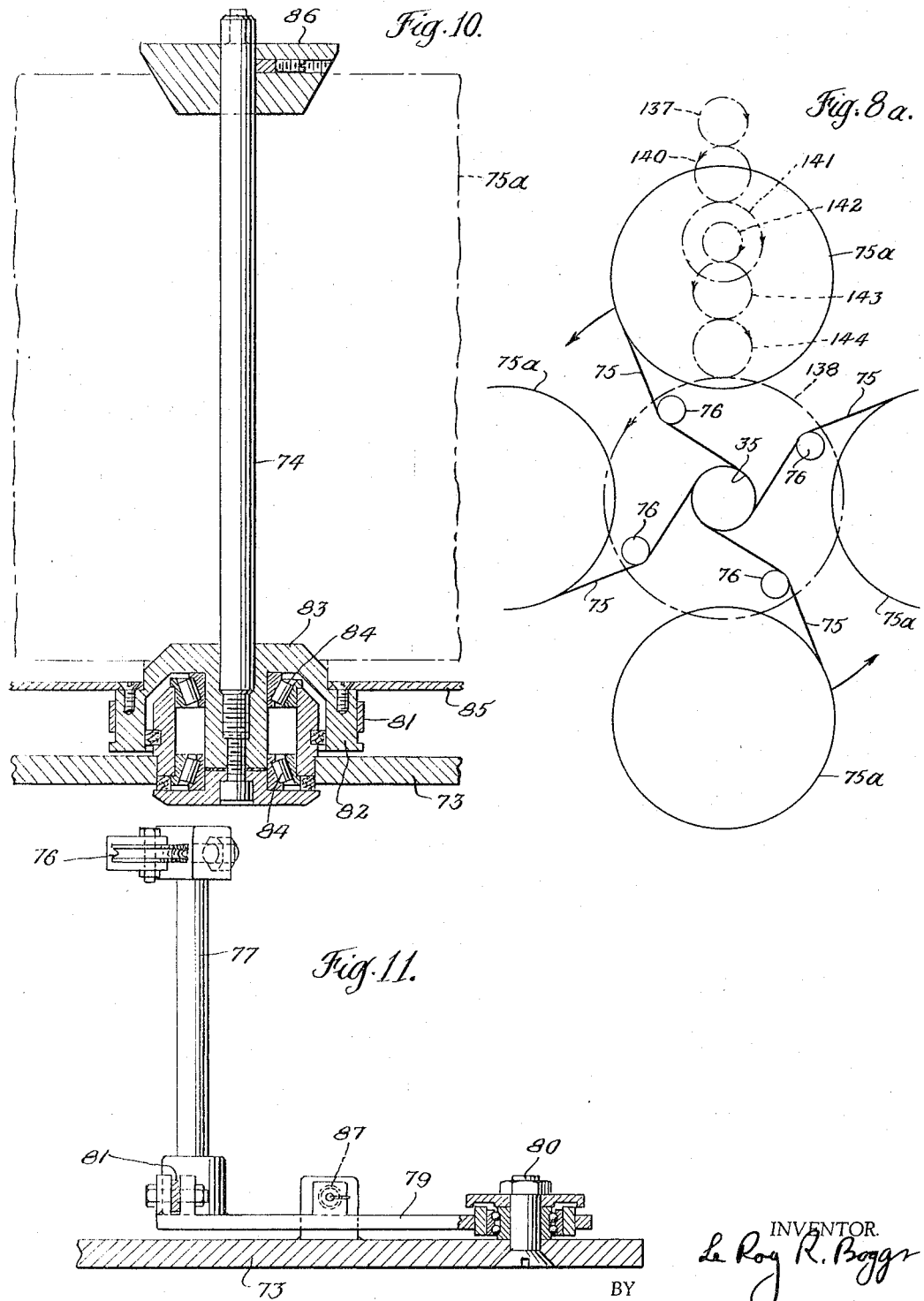

INVENTOR.
Le Roy R. Boggs
BY
ATTORNEYS

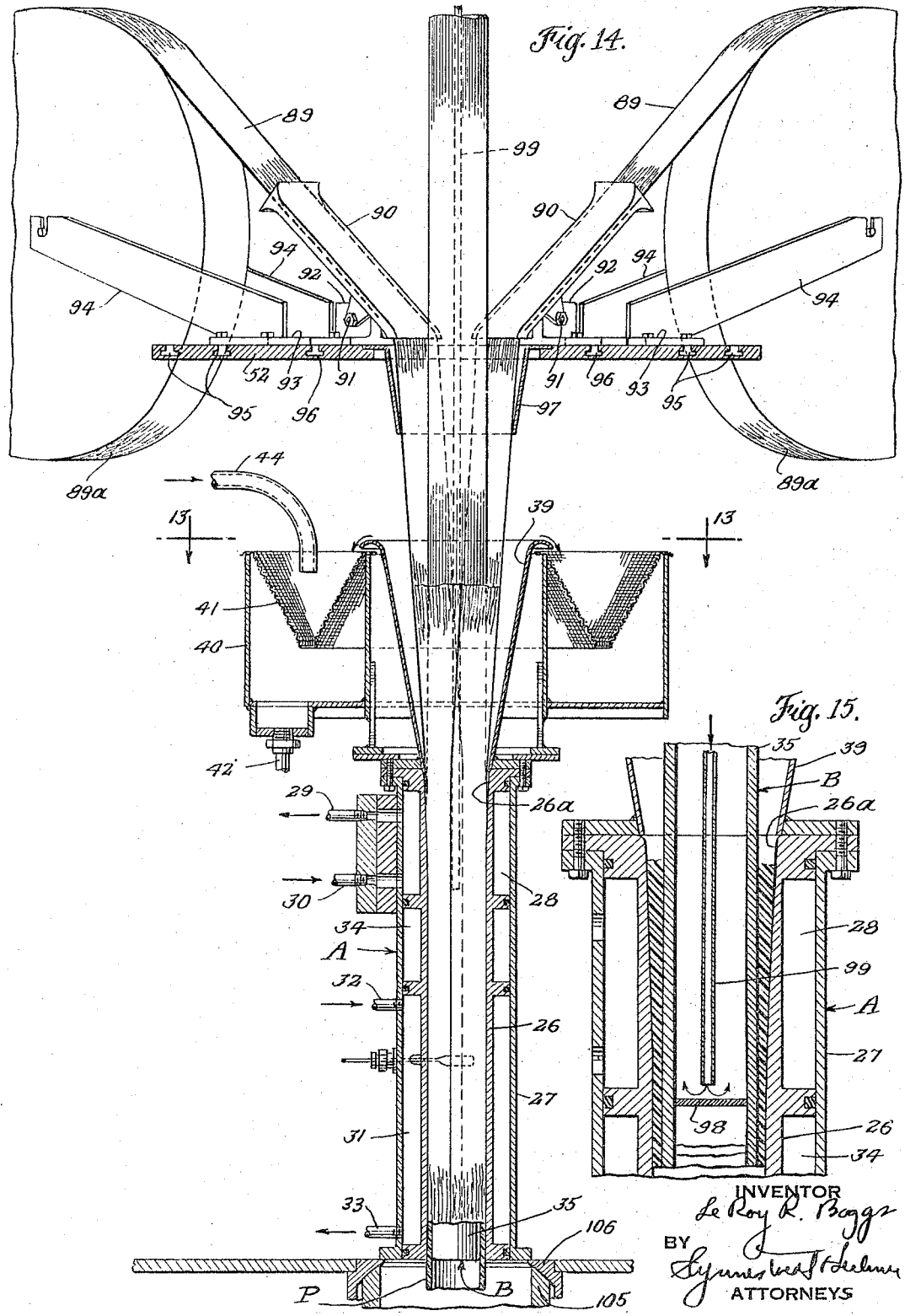

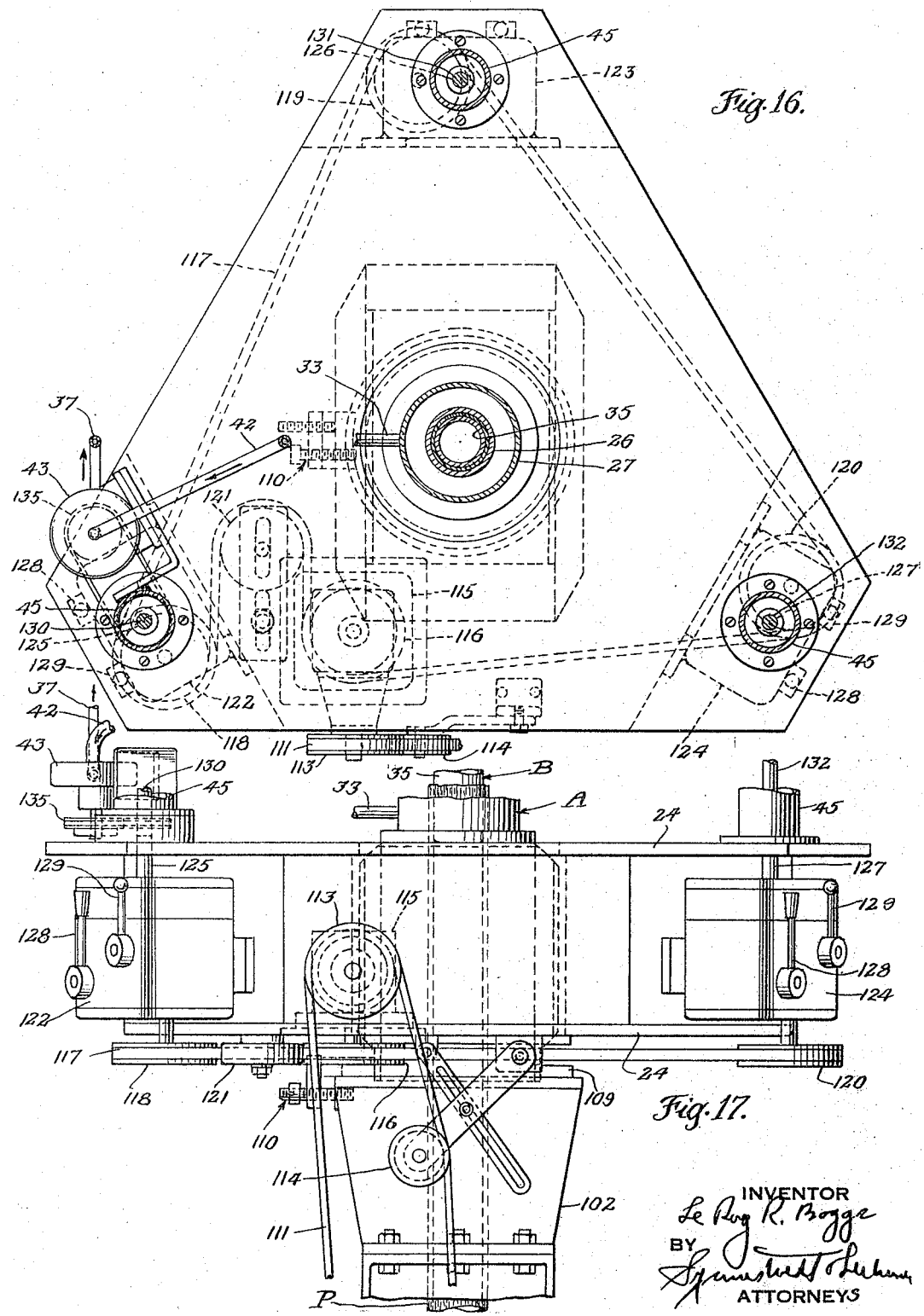

INVENTOR
Le Roy R. Boggs
BY
ATTORNEYS

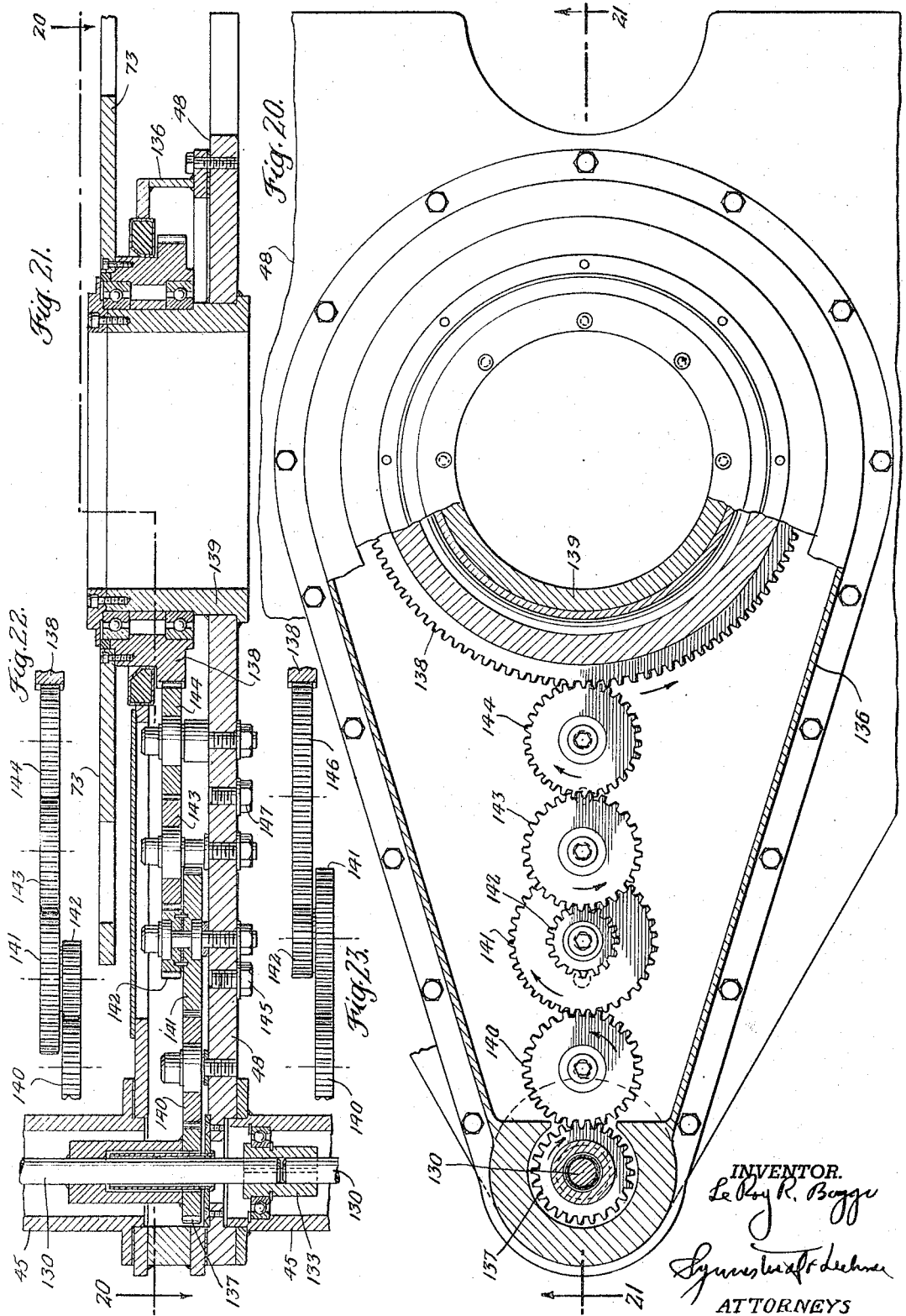

3,306,797
METHOD AND APPARATUS FOR MAKING ELONGATED ARTICLES OF FIBER REINFORCED RESIN MATERIAL
Le Roy R. Boggs, Bristol, Tenn., assignor to Universal Moulded Fiber Glass Corp., Bristol, Va., a corporation of Delaware
Filed Aug. 2, 1963, Ser. No. 299,636
34 Claims. (Cl. 156—171)

As to certain features of the present invention, the present application is a continuation in part of my co-pending application Serial No. 169,908, filed January 30, 1962, now Patent 3,235,429 issued February 15, 1966.

This invention relates to the production of articles composed of fiber reinforced resin materials and while the invention is not limited thereto, most aspects of the invention are of especial utility in the production of articles in tubular form. The invention is also especially concerned with the production of articles of indefinite length, preferably the substantially continuous production of such tubular articles.

In addition, while not limited thereto, most aspects of the invention are of especially utility in the production of fiber reinforced resin articles in which the resin employed as a starting material is a liquid heat hardenable or heat curable resin material, for instance polyester laminating resins in liquid form, which are capable of being converted to the solid stage by application of heat.

The present invention has a number of objects and advantages some of which are related to improvements in apparatus or equipment, and others to method phases of the invention.

One of the principal objects of the invention is to provide for controlled distribution and arrangement of reinforcement elements in the article being formed, the reinforcements comprising both longitudinally arranged reinforcement elements, as well as helically wound reinforcement elements, the two types of reinforcement elements being relatively arranged with respect to each other in a novel manner which not only contributes desirable properties to the article being made but which also facilitates the production thereof, as will further appear.

In accordance with another general aspect of the invention, provision is made for alternatively arranging both helical and longitudinal reinforcing elements in different relationships to each other by the use of a single equipment incorporating certain devices which are adapted alternatively to be assembled in different relationships with respect to each other. By way of example, the invention provides for the helical winding of a reinforcement roving outside of a helically wound reinforcement strip or, alternatively, by repositioning certain parts of the apparatus, for the helical winding of a strip outside of a helically wound layer of roving.

In considering certain other objects and advantages of the invention, it is here first noted that in the preferred embodiment of the equipment according to the invention, a forming device is employed having a generally upright forming passage extended therethrough and in which a core member is suspended, so as to define an annular passage into which the reisn and reinforcement materials are fed generally vertically downward, the resin being heated to effect hardening thereof in the forming passage and the hardened or solidified article being pulled downwardly out of the lower or discharge end of the forming passage by means of a puller mechanism incorporating travelling gripping elements adapted to engage and pull the article downwardly from the forming device.

In accordance with another aspect of the invention, an improved reinforcement feed and resin impregnation mechanism is provided, this improved mechanism or system providing for laying up the reinforcements on the core in a region above the forming passage and for impregnation of the reinforcements with the liquid resin material as it is being laid up upon the core. In this way highly effective impregnation is accomplished with a minimum of undesirable spread of the liquid resin over various parts of the apparatus.

In accordance with still another aspect of the invention, provision is made for mounting the reinforcement feeding and impregnating mechanisms in a structural tower which is sectionalized in a manner providing for alternative positioning of various elements or stages of the equipment in different sequence vertically of the tower to thereby enable alternative production of various desirable combinations of types and positions of reinforcement elements.

It is a further object of the invention to provide for the mounting of the reinforcement and resin feed devices and also of the forming device having the forming passage therein in rigid association with the sectionalized tower above referred to, while at the same time providing for suspension of the puller mechanism from the sectionalized tower with freedom for angular or shifting adjustment with respect to the tower, preferably by means of a puller supporting joint.

Another object of the invention is to provide a synchronizing means interrelating the operation of the puller mechanism for drawing the formed article from the forming device with the operation of the feeding devices by which various reinforcement elements may be helically wound. In this manner uniformity of product is assured with reference to various physical characteristics, including the concentration and distribution of the reinforcement elements.

In accordance with still another aspect of the invention provision is made for helical winding of rovings and also of strip reinforcement elements, the equipment provided for this purpose being adaptable to such helical winding in either dierction and, indeed, the equipment provides for the helical winding of a multiplicity of reinforcement elements, such as either rovings or strips, some of which are helically wound in one direction and some of which in the opposite direction.

In the arrangement of the invention provision is also made for applying longitudinally extending reinforcement elements, either rovings or strips outside of a layer or layers of helically wound reinforcements, this being of especial importance in equipment of the kind briefly described above wherein the article is formed by solidifying the resin within a forming passage and drawing the formed article therefrom by a puller mechanism, because the longitudinal elements applied on the outside of the article being made facilitate drawing the article through and from the forming device without breakage.

Still another object of the invention is the provision of a resin feed and impregnation system in accordance with which the resin is delivered to the outer surface of the core adjacent the top of the core in order to establish a stream of resin flowing down on the surface of the core, the reinforcement elements being applied to this resin-wetted surface and the resin thereby acting as a lubricant to facilitate the sliding movement of the reinforcement elements on the surface of the core. According to this feature of the invention provision is made for the feed of an excess of resin to the core and the recirculation of the excess resin. The recirculation means in synchronized in its operation with the puller mechanism by which the formed piece is drawn through and from the forming passage, so that the quantity of resin circulating will vary with variation in speed of operation of the puller mechanism.

A further important object of the invention is to enclose moving parts as completely as possible. This has important advantages in equipment of the kind herein disclosed for the following reasons:

(a) Safety for personnel;
(b) Protection of working parts from hostile environment of air-borne fibers, dust and other contaminants such as splashed resin;
(c) Prevention of fouling and wind-up of stray material strands.

These are important considerations in equipment of the kind herein disclosed.

*Brief description of figures*

How the foregoing and other objects and advantages are attained will appear in the following description referring to the accompanying drawings which illustrate a preferred embodiment of the apparatus of the invention and in which:

FIGURE 1 is an overall outline elevational view of the apparatus including the sectionalized tower structure, the forming device, the puller mechanism, and various of the devices for feeding fiber reinforcement elements and for effecting impregnation thereof with the liquid resin material in advance of entrance into the forming device. In this figure, there is illustrated, from top to bottom, a mounting or suspension for the core, a means for feeding liquid resin to the surface of the core, a longitudinal roving reinforcement feed station, a helically wound strip reinforcement feeding station, a helically wound roving reinforcement feed station of one hand, a helically wound roving reinforcement station of the opposite hand, a helically wound strip reinforcement feed station of hand opposite to the first such station mentioned, a longitudinal roving reinforcement feed station, a longitudinal strip reinforcement feed station, an excess resin accumulating reservoir and make-up resin supply means, the forming device, variable speed and reverse drive mechanisms, the flexible joint by which the puller mechanism depends from the tower or frame structure, and the puller mechanism;

FIGURES 1a and 1b are views of the upper portion of the tower structure but showing two different alternative positionings of various of the parts, so as to provide for introduction of reinforcement elements in different arrangements, as compared with FIGURE 1;

FIGURE 4 is a plan sectional view taken generally as indicated by the section line 4—4 on FIGURES 1 and 5 and illustrating a helically wound strip reinforcement feeding station, including drive means therefor, FIGURE 4 being on an enlarged scale as compared with FIGURE 1;

FIGURE 4a is a diagrammatic view of certain of the drive parts of FIGURE 4 modified to provide for helical wind of the strip in the opposite direction;

FIGURE 5 is an elevational view of the strip feed station shown in FIGURE 4;

FIGURE 6 is a vertical sectional view taken at right angles to FIGURE 5 as indicated by the line 6—6 on that figure;

FIGURE 7 is a plan view of certain of the turntable or rotative parts of the strip feed station shown in FIGURES 4 to 6;

FIGURE 8 is a plan sectional view taken generally as indicated by the section line 8—8 on FIGURES 1 and 9, and illustrating one of the helically wound roving reinforcement feed stations, FIGURE 8 being on an enlarged scale as compared with FIGURE 1;

FIGURE 8a is a diagrammatic plan view of various of the parts shown in FIGURE 8 but illustrating an alternative threading of the rovings to provide for helical wind thereof on the core in the opposite direction as compared with FIGURE 8;

FIGURE 9 is an elevational view of the roving feed station shown in FIGURE 8;

FIGURE 10 is a vertical sectional view of a roving spool support, taken as indicated by the line 10—10 on FIGURE 8, the parts here being shown on an enlarged scale;

FIGURE 11 is a vertical sectional view of certain details taken as indicated by the line 11—11 on FIGURE 8, these parts also being shown on an enlarged scale;

FIGURE 14 is a central vertical sectional view taken as indicated by the line 14—14 on FIGURE 12 of the strip feeding station and also showing in vertical section the resin handling equipment illustrated in FIGURE 13, and still further showing the forming device in vertical section;

FIGURE 15 is a still further enlarged fragmentary vertical sectional view of the upper portion of the forming device, and of the core therein;

FIGURE 16 is a plan sectional view taken generally as indicated by the section line 16—16 on FIGURE 1 and illustrating the arrangement of certain of the drive parts, FIGURE 16 being on an enlarged scale as compared with FIGURE 1;

FIGURE 17 is an elevational view of parts shown in FIGURE 16;

FIGURE 20 is an enlarged plan view with parts in horizontal section taken generally in the plane of line 20—20 on FIGURE 1 but with the parts shifted in position as will further appear, and illustrating certain of the drive parts for rotating one of the turntables carrying reinforcement elements, this view also being taken substantially as indicated by the line 20—20 applied to FIGURE 21;

FIGURE 21 is a vertical sectional view taken as indicated by the line 21—21 on FIGURE 20; and FIGURES 22 and 23 illustrate alternative gearing groups which may be substituted in the drive mechanism shown in FIGURES 20 and 21 in order to provide for different speed of operation and also to provide for reversal of direction of the helical wind.

Figure 2:
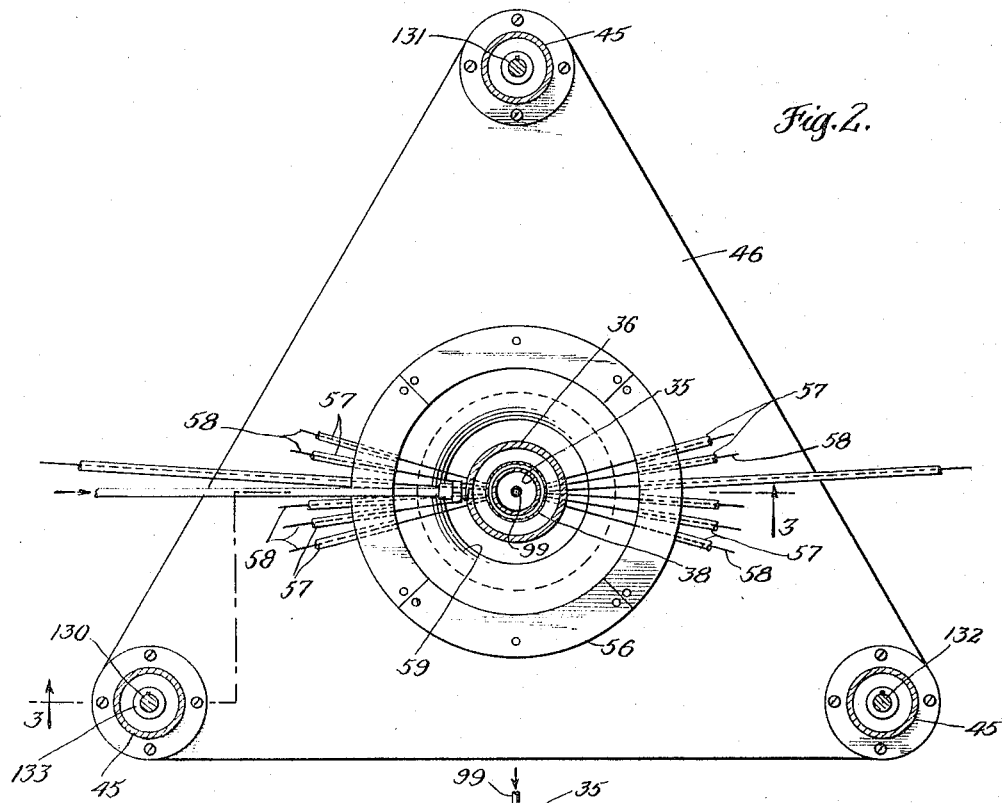
FIGURE 2 is a plan sectional view taken generally as indicated by the line 2—2 of FIGURES 1 and 3 and illustrating the means for feeding the liquid resin to the core and also one of the longitudinal roving reinforcement feed stations, certain of the roving feed guides being omitted for the sake of clarity, FIGURE 2 being on an enlarged scale as compared with FIGURE 1.

*General arrangement, forming device, core and resin feed*

In considering the following description of the method and apparatus herein disclosed as embodying the present invention it is first mentioned that although reinforcement elements of a variety of types may be used, the invention is particularly adapted to the handling and feeding of glass fiber reinforcements in the form of rovings and also in the form of strips, which latter may comprise either mat type material in which the glass fibers are randomly distributed or oriented, or woven or cloth types of fabric strips.

As already mentioned, it is contemplated according to the present invention that the fibrous reinforcement elements be delivered in impregnated condition into the forming passage of a forming device, the reinforcements preferably being impregnated with an excess of a liquid heat hardenable resin material, such as the well-known polyester laminating resins. The quantity or volume of reinforcement and resin fed to the entrance end of the forming passage is such that the reinforcements are placed under some compression as they enter the forming passage. This results in squeezing out excess resin and also air or gas bubbles in the entrance end portion of the forming passage, which is preferably tapered as will further appear, in order to progressively compact or compress the impregnated reinforcements. In the entrance end of the forming passage the resin material is cooled or maintained at a temperature sufficiently low to avoid any appreciable setting of any resin constituents which are expelled from the entrance end of the forming passage. This avoids gradual build up of cured or hardened resin constituents in the entrance end of the forming passage and also in the excess resin receptacle which is associated with the entrance end of the forming passage.

As the impregnated reinforcement progresses through the forming device heat is applied in order to cure or harden the resin while the materials are passing through the forming passage.

Beyond the discharge end of the forming passage the solidified or formed article is gripped by the gripping elements of a puller mechanism by means of which the formed article is drawn from the forming passage and further by means of which all of the materials are drawn into the forming passage on the input side of the system.

In considering the equipment illustrated in the drawings for carrying out the feeding and impregnating of the fiber reinforcements and the delivery thereof to and through the forming device, attention is first directed to FIGURES 1, 2, 3, 13 and 14. The forming device is indicated generally by the letter A in FIGURE 1, this device being mounted on a horizontal support structure comprising horizontal plates 24 which are mounted in turn on a support structure comprising for example the upright channel members 25. A core generally indicated by the letter B is suspended at the top of the apparatus at the top of FIGURE 1 and depends therefrom down through the various reinforcement feed stations and into the forming device, the lower end of the core also appearing toward the bottom of FIGURE 14.

As seen in FIGURES 14 and 15, the forming device comprises an inner tubular part 26 defining the outside of a generally vertical forming passage, the upper end of this tubular part being outwardly flared as clearly appears at 26a in FIGURE 15 in order to provide a tapered or enlarged inlet to the forming passage. The forming device is provided with a jacket 27 in the upper portion of which is a chamber 28 provided for the circulation of a cooling medium such as water as by means of connections 29 and 30. In the lower portion of the jacket is a chamber 31 provided for circulation of a heating medium, for instance steam, with an inlet arranged at 32 and an outlet at 33. A dead space or chamber 34 is desirably provided in the jacket between the cooling chamber 28 and the heating chamber 31.

Figure 3:
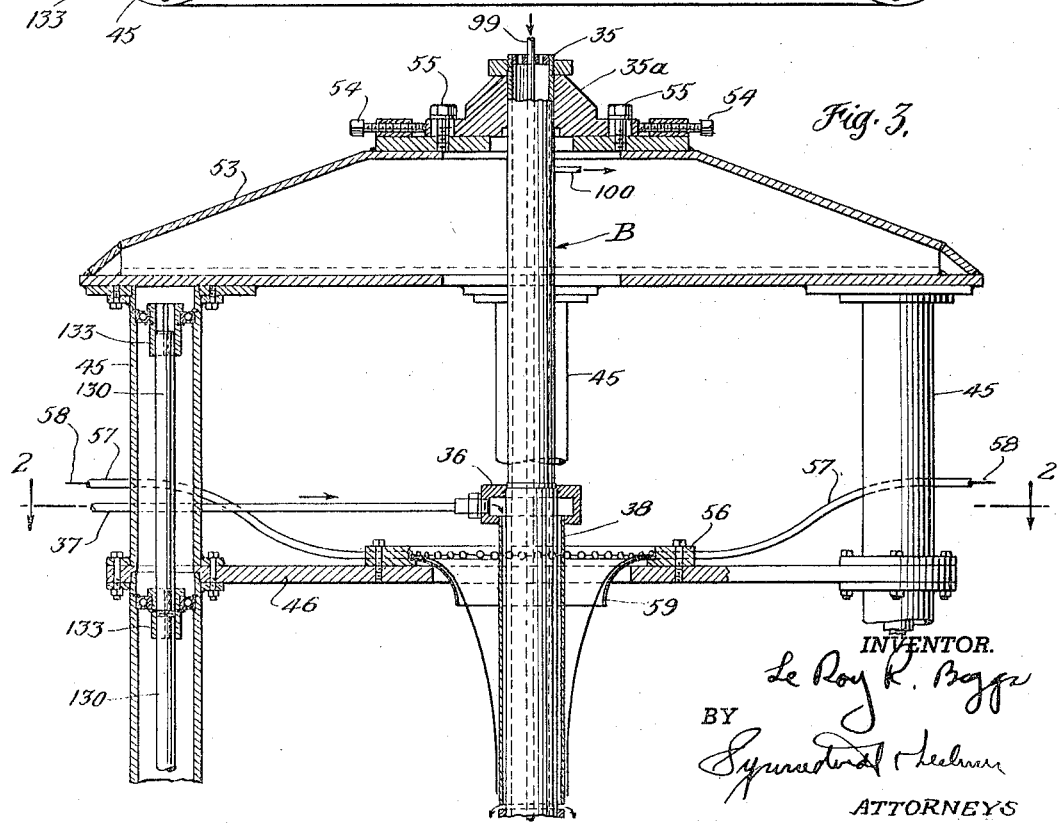
FIGURE 3 is an elevational view, with certain parts in vertical section taken as indicated by the line 3—3 on FIGURE 2.

The core, as seen in FIGURES 3, 14 and 15 comprises a tubular member 35 which is supported from a fitting 35a at the top of the apparatus and which extends therefrom all the way down through the tower and the reinforcement feeding devices carried thereby, into the entrance end of the forming passage and downwardly through the forming passage to a point adjacent the lower or discharge end thereof. In this way an annular forming passage is defined within the forming device in order to provide for the production of tubular articles which may have any of a variety of cross sectional shapes, although a typical example is a circular tube or pipe, such as shown at P toward the bottom of FIGURES 1 and 14.

Generally described, it may be said that the reinforcements are fed to and laid up upon the core and are then caused to move downwardly in assembled condition along the core and into the annular forming passage of the forming device. In accordance with the present invention this is achieved in a novel manner and by the use of certain novel equipment to be described. In this connection it is first noted that according to the present invention the resin is introduced into the system by developing a stream of liquid resin on the outside surface of the core at a point above the zone in which at least most of the reinforcements are brought to or laid upon the surface of the core, this feature also being disclosed in my copending application Serial No. 169,908 above identified. Thus, as seen in FIGURES 1, 2 and 3, toward the upper end of the core tube 35 a resin manifold 36 is provided, this manifold being supplied with resin through the supply pipe 37 and having an annular opening adjacent the core tube wall at the lower side of the manifold communicating with the interior of a sleeve 38 surrounding the core tube and serving to assist in distributing the resin over the surface of the tube. The resin is delivered from the lower end of the tube (see arrows toward the bottom of FIGURE 3) onto the external surface of the core tube to flow downwardly on that surface by gravity and thus flood and impregnate the reinforcements which are wound or laid upon the core surface at the several stations below the point of resin feed. In this way all of the reinforcements used in the make-up of a given article are impregnated as they are delivered to or laid upon the core, and in the preferred operation, sufficient resin is fed at the upper end of the core so that an excess is present at the entrance end of the forming passage of the forming device, which excess will be rejected by the forming passage, the excess being accumulated in a receptacle 39 (see FIGURES 1, 13 and 14).

As will be seen, especially in FIGURE 14, the resin receptacle 39 constitutes a generally conical pan the lower or small end of which is open into the entrance end of the forming passage in the forming device. In this way a reservoir of liquid resin is maintained at the entrance end of the forming passage. Since an excess of resin is fed downwardly along the core, this excess is collected in, filled and overflows from the receptacle 39, as is indicated by the overflow arrows in FIGURE 14, the overflow being received in the surrounding annular resin chamber 40, an annular screen 41 being interposed in order to strain out any foreign matter and collect such foreign material in a location which is readily accessible for removal from the system. The excess resin is then recirculated by being withdrawn through the pipe 42 which leads to the inlet side of the resin pump 43 (see FIGURES 1, 13, 14, 16 and 17). The pipe 37 above mentioned for carrying the resin to the upper end of the core is associated with the discharge side of pump 43 to receive the recirculating resin therefrom. Make-up resin for the system is introduced by the supply connection 44 which delivers resin into the screen 41, the make-up resin thus also being strained at a point providing for ready accessibility for removing foreign material.

Before considering the structure and arrangement of the several reinforcement stations, it is here first pointed out that these several devices are all mounted in a sectionalized structural tower made up of three sectionalized posts or columns, each comprising a series of hollow posts such as indicated at 45, the three posts, see for example the plan section of FIGURE 2, being located at the corners of a triangle. At the several vertical stations there are a series of post-interconnecting plates 46, 47, 48, 49, 50, 51 and 52. The lowermost ends of the lowermost hollow posts 45 are mounted upon the plate 24 which forms the upper deck of the structure for supporting the remainder of the tower and the forming device A. Various of these decks or plates 46 to 52 and 24 are somewhat differently arranged and carry different types of elements, particularly those adapted for the feed of various resin reinforcement pieces.

Surmounting the top of the uppermost posts 45 is a cap member 53 which interconnects the upper ends of the topmost posts 45, and this cap member in turn carries the fitting 35a (see FIGURE 3) from which the core tube 35 is suspended. Preferably an adjustment device, shown in FIGURE 3, is provided for enabling shifting the position of the core mounting fitting 35a in any direction horizontally. For this purpose adjustment screws 54 are employed in two different planes, two such screws being shown in FIGURE 3 and there being two more in the plane at right angles to FIGURE 3. Studs 55 are provided to rigidly fasten the fitting 36 in any adjusted position. In this way proper alignment of the core with the forming device may be provided for and in addition, in the event of tendency for the core to deflect in one direction or another from its properly centered position within the forming passage, such tendency may be compensated for or corrected by shifting movement of the core at the upper end.

*Reinforcement feed stations*

The uppermost of the decks 46 for carrying resin feed equipment is shown in some detail in FIGURES 2 and 3. On this plate is mounted a ring 56 having a multiplicity of radially arranged apertured with each of which a guide tube 57 is associated in order to receive and guide individual rovings 58 radially inwardly for delivery downwardly within the generally conical guide 59 to the outer surface of the core at about the point at which the resin stream on the core is initiated. These rovings are thus impregnated as they are laid upon the outer surface of the core.

At the next station, i.e., on the deck or plate 47, there is mounted a fibrous strip feed mechanism the arrangement of which is illustrated in FIGURES 4 to 7 inclusive. This mechanism is built up on an annular base part 60 which is mounted for rotation about a vertical axis coincident with the axis of the core, the core projecting downwardly through the central opening in this base part which opening clearly appears in FIGURES 4 to 7. Upon this base part are mounted a pair of upright plates 61, each of which is provided with a spindle 62 on which is mounted a roll of fiber reinforcement strip material as indicated at 63. A retainer and guide plate 64 for each of these rolls is removably mounted upon the spindle 62 by means of the hand operated locking nut 65.

The vertical mounting plate 61 for each of the supply rolls 63 serves also to mount certain guide devices over which the strip material is fed to the core. Thus, referring particularly to FIGURES 4 and 5, each mounting plate 61 serves to carry a generally horizontal guide 66 paralleling the axis of the mounting shaft 62 for the roll and over which the strip first passes. From guide 66 the strip is threaded under and over an inclined guide 67 and thence is fed over an inclined guide 68 positioned with its axis in vertical plane containing the axis of the core tube 35. By this system of guides the strip material is brought from the roll which is rotating upon a horizontal axis into the proper position for being fed to the surface of the core tube 35 for helical winding thereof on the core as the annular mounting platform 60 for this assembly is rotated. By virtue of the guide arrangement, including especially the terminal guide 68 lying in a radial plane containing the axis of the core, the strip material may be fed to either side of the core, to thereby enable helical winding of the strip in either hand. The winding in one hand is shown in FIGURE 4 and in the opposite hand in FIGURE 4a, the direction of the arrows in these two figures representing the direction of rotation of the rotative base ring 60 and thus of the assembly of parts around the vertical axis of the core.

The bracket 69 for mounting guide 68 is in turn mounted on the plate 61 by means of bolts 70 which pass through arcuately elongated slots 71 (see FIGURE 5) by means of which the angle of the guide 68 may be altered and thereby vary the pitch of the helical winding being effected. This of course will be varied in accordance with the speed of drawing of the reinforcements downwardly into and through the forming device as well as speed of rotation of the annular base 60 for mounting the strips. The drive mechanisms provided are described hereinafter, following description of certain other parts which are also driven through the drive system provided.

It will now be seen that by providing the feeding arrangements above described as being mounted on the platforms 46 and 47, the core first receives longitudinal rovings and thereafter helically wound strips, representing two layers of reinforcements. Additional layers are provided as described below.

At the next lower station, represented by the deck 48 certain roving reinforcements are helically wound on top of the helically wound strips just described. The mechanism for this purpose is particularly illustrated in FIGURES 8 to 11 inclusive. Here again the winding equipment is mounted upon an annular rotating base part 72 which is provided with a rotative mounting on the deck 48 and which carries a circular turntable 73. The turntable 73 serves to carry a plurality of upright spindles 74, four being here shown, each of which serves to mount a spool or roll 75a of roving. From the spool each roving 75 is led over a guide pulley 76 having a swivel mounting on a post 77 (see FIGURES 8 and 11), so that the guide pulley 76 may tilt with reference to a horizontal plane as the roving leaves the spool from the upper or lower part thereof. From the guide pulley 76 the roving passes over another idler pulley 78 and is threaded therefrom to the core.

The post 77 for mounting the guide pulley 76 is carried by a lever 79 (see FIGURES 8 and 11), the lever being pivoted at 80 to the turntable 73 and serving to operate a brake for regulating the tension of the roving as it is fed from the spool or supply roll to the core. This brake comprises a brake band 81 curved around a brake drum 82 (see FIGURES 8 and 10) which is provided on the box 83 at the lower end of the spool supporting spindle 74, such box also being employed to house and mount bearings 84 by which the spindle is journaled on the turntable 73. The box 83 also serves to mount a platform 85 on which the spool 75a of roving may be mounted. The roving spool may be fastened in position on the spindle 74 by means of the adjustable conical or wedging block 86 at the top of the spindle so that the friction applied by the brake 81 will be effective in retarding the unwinding motion of the spool 75a. The pressure of engagement of the tension brake is provided by a tension spring 87 (see FIGURE 8) which acts on the lever 79 in a direction to engage the brake. However as the tension of the roving will be felt by the guide roller 76, as the tension increases it will be seen that with the position of the parts as shown in FIGURE 8 the increase in tension will tend to act against the spring 87 and thus tend to release the braking force. In this way an equalization is obtained by the action of the spring 87; and the tension tends to remain constant as the roving unwinds and the diameter of the spool diminishes. In addition the spring tension is adjustable as by means of the adjustment screw and nut 88 so that the normal tension may be regulated to any desired value.

The parts illustrated in FIGURES 8, 9, 10 and 11 have thus far been described with relation to the helical winding of rovings in one hand. The threading employed for roving winding in the opposite hand is illustrated in FIGURE 8a. For this purpose all that is required is that the thread around the idler roller 78 of FIGURE 8 be omitted, the threading path of the rovings 75 being arranged to pass the guide roller 76 and from there directly to the core 35. However since the guide roller 76 will also, in the threading arrangement of FIGURE 8a, experience the tension of the roving, the braking action and the automatic regulation of tension will nevertheless be operative and thus will be available for either hand of helical winding. The direction of rotation of the various parts is indicated by arrows in FIGURES 8 and 8a for the two opposite directions of helical wind.

The mechanism by which driving of the turntable for winding rovings is effected will be described hereinafter following description of certain other parts.

As seen in FIGURE 1 another stage of roving winding is provided below that carried by the deck 48, this second roving winding being supported by the deck 49. The construction of the parts carried by the deck 49 need not be illustrated or described in detail in view of the description and illustration of the parts carried by the deck 48. Indeed these parts may be identical and it is contemplated that in arrangement such as the arrangement in FIGURE 1 that one of these two roving stations should be operated to provide helical wind in one hand and the other to provide helical wind in the other hand. In other words one would be rotated as indicated in FIGURE 8 and the other as indicated in FIGURE 8a and drive mechanism is provided for rotating the turntables in opposite directions in a manner to be described hereinafter.

The next station of the tower as shown in FIGURE 1 is represented by the deck 50, this deck serving to mount a strip winding mechanism of the kind described above with particular reference to FIGURES 4 to 7 inclusive. Here it is contemplated that the hand of the helical winding of the strip wound at the station carried by deck 50 should be opposite to that of the strip wound at the station carried by the deck 47. In other words at the upper of these two stations it is contemplated that the wind should be in accordance with the illustration of FIGURE 4 and that the lower of these stations should be in accordance with the showing of FIGURE 4a.

Below the deck 50 is another deck 51 by which a group of rovings may be fed longitudinally to the core in exactly the same manner as described above for the station supported on the deck 46, the construction of which is fully illustrated in FIGURES 2 and 3 and already described above.

Figure 12:
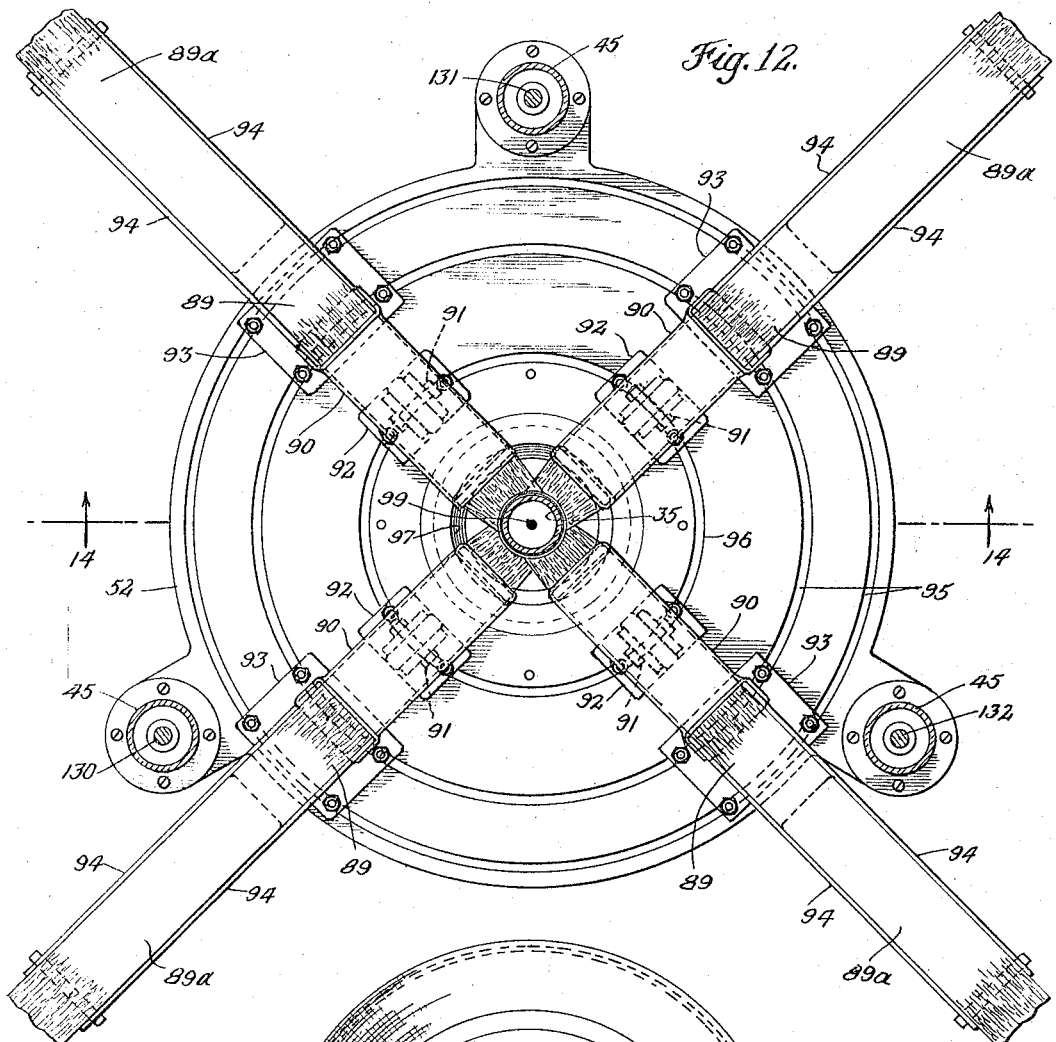
FIGURE 12 is a plan sectional view taken generally as indicated by the section line 12—12 on FIGURE 1 and illustrating a longitudinal strip reinforcement feed station, FIGURE 12 being on an enlarged scale as compared with FIGURE 1.
Figure 13:
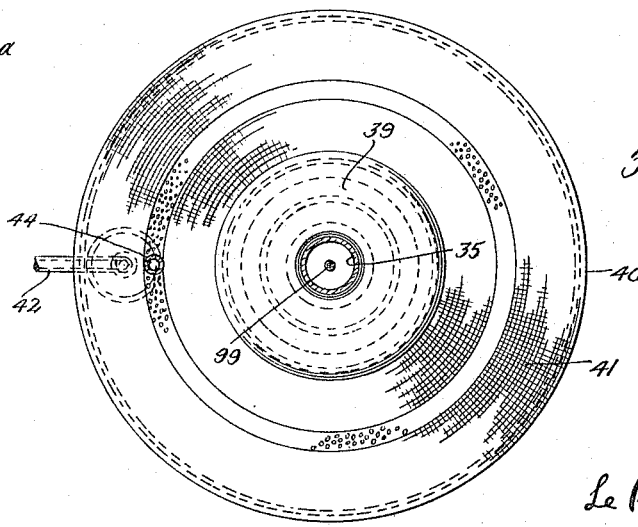
FIGURE 13 is a plan view of the resin collecting reservoir and resin make-up means, taken as indicated by the line 13—13 on FIGURES 1 and 14, FIGURE 13 being on an enlarged scale as compared with FIGURE 1.

Proceeding next to the station represented by the deck 52, it is first noted that here provision is made for feeding reinforcement strips to the core in longitudinal position rather than by helical winding. The arrangement of the parts at this station is particularly illustrated in FIGURES 12 and 14. Here it will be seen that the deck 52 is generally circular, except for tabs projecting radially for connection with the posts 45. A plurality of strip reels 89a are mounted on the deck 52, four such reels being here shown and from each of these reels the strip 89 is fed through a tubular guide 90 which is pivotally mounted at 91 on a bracket 92. Another bracket 93 serves to carry a pair of plates or arms 94 by means of which the spool or roll of the mat 89a is journalled. The deck 52 is provided with undercut annular grooves such as indicated at 95 and 96 by means of which the brackets 93 and 92 may be mounted. Because of the annular character of these grooves these brackets may be mounted in any radial position. This arrangement will also permit mounting and uniformly spacing either a greater or lesser number of strip reels. As shown the four strips are led inwardly toward the core and guided by a conical guide element 97 (see FIGURE 14) which serves to initiate the folding of the strips about the core. In the embodiment illustrated the strips and the number thereof are such as to provide for an overlap circumferentially of the piece being made but they may also be arranged so as to bring their edges into abutting relation, rather than actually overlapping.

From FIGURE 14 it will be noted that these strips are not finally snugly laid against the core until entrance of the reinforcement mass into the entrance end of the passage in the forming device. Because of this the strips 89 pass through the body of resin in the receptacle 39 before snug contact with the core. However it should be kept in mind that there is a current or stream of resin flowing downwardly of the core and over the reinforcements applied thereto, so that the inner surfaces of the strips 89 will receive effective contact with resin and thereby become effectively impregnated.

As above brought out, the forming device is provided with a jacket having a cooling chamber 28 and also a heating chamber 31 by means of which the resin in the entrance end portion of the forming passage is prevented from hardening, while at the same time the resin is hardened in the latter portion. If desired a heating chamber may also be provided within the core in the lower region of the forming device, for instance by providing appropriate partitioning within the core and circulation connections for steam or other heating medium. Such an arrangement forms no part of the present invention per se and need not be considered in detail herein but an example of such arrangement is shown in my copending application Serial No. 169,908 filed January 30, 1962. In the case of the apparatus disclosed in the present invention, it is preferred to include at least a means for cooling the upper portion of the core. For this purpose a partition 98 (see FIGURE 15) is located in the core at an elevation just below the cooling chamber 28 provided in the jacket for the forming device. A tube 99 for supplying a cooling medium such as water is arranged to project downwardly into the core from the upper end thereof (see FIGURES 3 and 15) and an outlet 100 is also provided for discharge of the cooling medium from the interior of the core. In this way the entire length of the core above the forming device and also within the forming device in the region of the cooling chamber 28 is subjected to a cooling action to thereby prevent build up of hardened or cured constitutents in the mass of circulating and recirculating resins.

*Puller mechanism*

Figure 19:
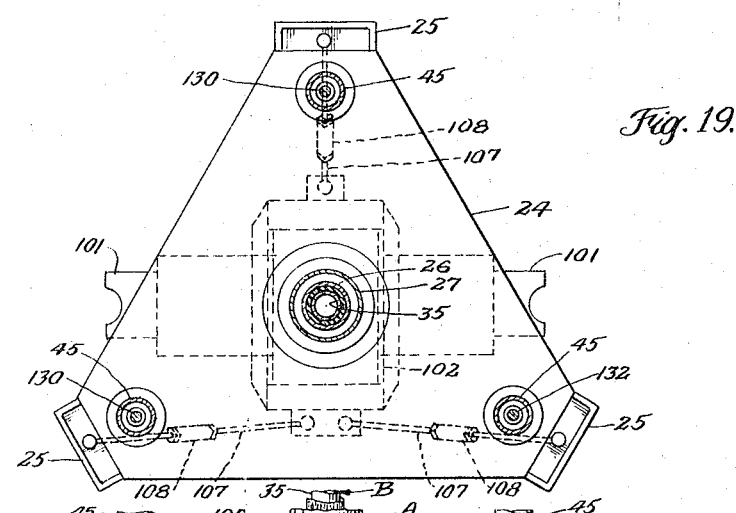
FIGURE 19 is a plan view of certain parts shown in FIGURE 18, certain parts also being shown in horizontal section generally as indicated by the line 19—19 on FIGURE 1, this view being on the scale of FIGURE 18, and omitting certain of the drive or transmission parts in order to better illustrate others.
Figure 18:
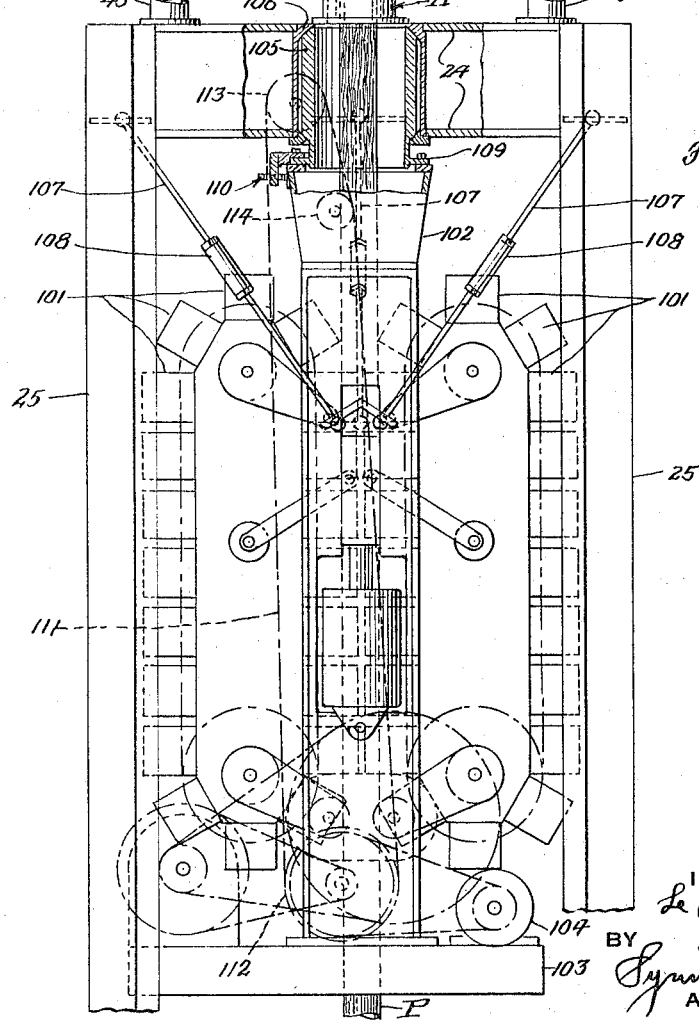
FIGURE 18 is an enlarged elevational view, with certain parts in vertical section, of the puller mechanism shown toward the bottom of FIGURE 1.

Attention is next directed to the arrangement of the puller mechanism toward the bottom of the apparatus as seen in FIGURE 1, this puller mechanism also appearing in FIGURES 18 and 19. The puller mechanism itself need not be considered in detail herein, as it may be similar to that described in my copending application Serial No. 142,749, filed September 18, 1961, now Patent 3,151,-354 issued October 6, 1964. However, it is here noted that the puller mechanism comprises two crawler tread devices each carrying a series of puller blocks 101 which cooperate to grip the piece being formed and pull it from the forming passage. The puller mechanism is mounted on a main frame structure 102 at the bottom of which there is arranged deck 103 on which the motor 104 for the puller mechanism is carried, this motor being connected through chains, sprockets and gearing with the crawler treads in order to actuate the pairs of gripping elements 101. Although the details of this mechanism need not be described herein the drive mechanism for the puller preferably incorporates a vairable speed device so that the speed of pulling the article from the forming passage may be regulated.

The entire assembly of the puller mechanism, its frame 102, deck 103 and the motor and drive transmission parts are all carried by means of a connection at the upper end of the frame 102 with the base structure of the tower incorporating the deck plates 24—24. For this purpose a ball and socket joint is provided between the frame of the puller mechanism and the structure 24—24 of the tower. The ball part of this joint is indicated in FIGURE 18 at 105 and the socket part at 106, the former being connected with the puller frame 102 and the latter with the tower structure. By means of this joint the entire puller mechanism and its driving parts may be shifted in angular position with relation to the axis of the forming passage through the forming device, and this provides for change in angular relation between the line of pull of the puller mechanism and the axis of the forming passage which is desirable in certain instances for reasons fully described in my copending application Serial No. 115,633 filed June 8, 1961. The angular position of the puller mechanism may be fixed by means of ties or guys 107 (see FIGURES 1, 18 and 19), three such guys being provided and each incorporating an adjustable screw device 108.

In accordance with the present invention it is also contemplated that the entire puller mechanism unit with its drive mechanism and associated parts should be capable of shifting movement transversely of the axis of the passage through the forming device in a plane in which the gripping elements engage the formed piece. For this purpose the flange 109 by which the puller frame is fastened to the ball member 105 is provided with elongated bolt slots and an adjustable screw device 110 (see FIGURES 16 and 18) is arranged to shift the puller mechanism with relation to the part 105, the bolts extending through the elongated slots serving to tighten the joint in any desired relative position between the puller frame and the member 105. This provides for variation in the relation between the axis of the forming passage and the line of pull of the puller device in the plane in which the gripping elements 101 yieldingly engage the piece being drawn from the forming passage. Alignment of the gripping elements 101 with relation to the piece being formed in the other plane is preferably provided for, but the arrangement for this purpose need not be considered in detail herein but is described in my copending application Serial No. 288,265, filed June 17, 1963, now Patent 3,256,559 issued June 21, 1966. As there disclosed such a mechanism provides for shifting movement of the blocks 101 in a direction perpendicular to the plane in which the gripping elements engage the piece being formed.

According to the foregoing the entire puller unit is capable not only of angular shifting movement but also of parallel shifting movement with respect to the axis of the forming passage and these motions are all provided for by the flexible joints at the upper end of the puller mechanism. In this connection it will be understood that the entire puller mechanism including the platform 103 and the motor and transmission parts are not rigidly connected with the supporting channels 25, except indirectly through the joints at the upper end of the puller frame.

*Driving and synchronizing mechanisms*

In accordance with another aspect of the invention it is contemplated that certain of the devices described above shall be driven in a synchronized relation to the drive of the puller mechanism. This is accomplished according to the present invention by employment of a drive belt 111 (see FIGURES 1, 16, 17 and 18). This belt is associated toward its lower end with a pulley 112 incorporated in the drive system for the puller mechanism, the belt also being associated at its upper end with a pulley 113 mounted on one of the decks 24. An adjustable idler 114 is also provided for the belt 111. The pulley 113 which rotates on a horizontal axis is connected through a bevel gearing unit 115 with a pulley 116 mounted on an upright axis, as will be clear from examination of FIGURES 16 and 17. Pulley 116 in turn serves to drive additional power transmission parts which are in turn driven and interconnected by a belt 117 engaging the pulley 116. This belt 117 passes around driven pulleys 118, 119 and 120, an adjustable idler 121 also being provided in the circuit of the belt 117.

Each of the driven pulleys 118, 119 and 120 is mounted on the input shaft of a power transmission unit, the three such units being numbered 122, 123 and 124. Each of these units has a power output shaft, respectively numbered 125, 126 and 127. Each of the transmission units further has two controls, one such control, indicated at 128, providing for infinite variation of speed from zero to the maximum obtainable, and the other control 129 providing for reversal in direction of drive of the output shaft of the unit. Transmission units of this type are well known and readily available and the details thereof need not be considered herein. The shafts 125, 126 and 127 are connected through a series of aligned shaft sections lying within the sectionalized posts 45 extending all the way to the top of the tower. Such shaft sections are shown for example at 130, 131 and 132 in FIGURES 1, 2, 4, 5, 8, 9, 12 and 19, from which it will be seen that in each of the hollow sectionalized posts 45 there is a sectionalized drive shaft extending from the transmission unit 122, 123 or 124 all the way to the top of the tower. These shafts are used for the driving of various of the devices mounted on the tower which require driven operation; and the transmission system including the sectionalized vertical driving shafts, the transmission units at the lower ends thereof, and the belt drives therefor initially having a power take-off from the driving means for the puller mechanism provides for synchronization of the drive for the various devices mounted on the tower with the drive of the puller mechanism. Between the sections of each of the sectionalized vertical shaftings there are splined slip joints such as indicated at 133 toward the left in FIGURE 3 by means of which the sections of each shaft may be separated at points adjacent to the points of separation of the hollow sectionalized posts 45 within which the shafts are arranged. In this way not only the support but also the drive mechanism for the various reinforcement feed devices may readily be assembled in various different relationships, in which connection it will be noted that even those feed devices or stations which do not require a turntable drive, for instance the longitudinal roving and mat stations mounted on decks 46, 51 and 52, nevertheless are provided with spacing or supporting posts in which setcions of drive shafting are provided so as to carry the drive therebeyond to other stations which do require turntable or other drive. In this way the several stations are universally assemblable in any relatively superimposed relationship.

In the embodiment as assembled in FIGURE 1, the helical roving feeding station mounted on deck 48 is driven from the sectionalized shafting 131 lying within the sectionalized posts 45 to the rear of the figure, this mechanism being shown in some detail in FIGURES 20 to 23 inclusive, described herebelow. Similarly the helical roving feeding device mounted on deck 49 is also driven from the same sectionalized shaft 131 to the rear of FIGURE 1. The two helical strip feeding stations mounted on decks 47 and 50 are both driven from the sectionalized shafting 132 located in the sectionalized posts 45 to the right of the equipment as viewed in FIGURE 1.

The pump drive (see FIGURES 16 and 17) may be effected by a chain or belt 135 cooperating with pulleys associated with the drive shaft 130 and with the pump.

The arrangement of the drive systems as above described provides for a synchronized operation of the resin circulating pump and of the reinforcement for the device with the puller mechanism. Although gearings or chain drives might be utilized in certain of the drive synchronizing parts, the employment of belts, such as those shown at 111, 117 and 135 provide adequate synchronization for most purposes and are preferred for their simplicity. Slight creepage which may occur with belt drives will not have a significant influence on synchronization, as will be apparent when considering the fact that the materials here being handled are flexible and have "give" or softness.

The synchronization of the resin circulating pump with the puller mechanism is advantageous because when the puller mechanism is operated at an increased speed, an increased quantity of resin is of course taken out of the system and, in order to insure sufficient resin to maintain the receptacle 39 full and overflowing an increased quantity of resin delivered to the upper end of the mandrel is required. This of course is obtained by synchronization of the pump with the puller mechanism.

The synchronization of the turntable drives for the helical reinforcement feed devices also provides for maintaining the helical winding uniform even when the rate of operation of the puller mechanism is varied.

The speed control 128 for each of the transmission units 122, 123 and 124 provides for variation in the setting of the drive for the resin pump and for the reinforcement feed devices relative to the speed of operation of the puller mechanism, so that the relative speeds of synchronization may be altered.

The various units mounted on the tower and requiring synchronized drive with the puller mechanism may derive power from any one of the three vertical sectionalized drive shafts. In other words, although the units mounted on decks 47 and 50 are shown in FIGURE 1 as deriving power from the right hand shaft 32, they could be swung around in position so as to be driven by either of the other two vertical shaftings, or one may derive its power from one shaft and another from another shaft, according to the particular assembled and driving interrelationship desired between the several units.

One of the driven systems for a unit such as the helical roving feeding unit mounted on deck 48 is shown in some detail in FIGURES 20 to 23, although here the gearing or transmission parts have been swung around, as compared with FIGURE 1, so as to indicate power take-off from the shaft 130 at the left of FIGURE 1. This power take-off unit is mounted within a casing 136 adapted to be bolted to one of the decks, for instance deck 48. The unit includes a gear 137 arranged to receive power from one of the sections of the drive shaft. The unit further includes a driven gear 138 journaled on the sleeve 139 rigidly fastened in the center of the apparatus in order to pass (with clearance) the central core tube 35. The driven gear 138 is connected with the rotative platform or turntable 73 on which the spools of roving are mounted (see FIGURES 8 to 11) and gearing is provided to interconnect the power take-off gear 137 with the driven gear 138. The gearing shown for this purpose in FIGURES 20 and 21 is the same as the gearing illustrated diagrammatically in FIGURE 8a (and also in FIGURE 4a) and includes gear 140 intermeshing with gear 137 and with gear 141 which has a common shaft with and is connected with gear 142, the latter meshing with the gear 143 which in turn engages gear 144 which delivers the power to gear 138.

It will be noted that the arrangement of gears 141 and 142 provides a stepdown in the transmission ratio of this gearing system. This multiple gear (141–142) is adapted to be alternatively positioned in the gearing train in a different manner in order to provide a step-up in the transmission ratio. This is illustrated in FIGURE 22 from which it will be seen that the gear unit 141–142 has been inverted in position as compared with its position in FIGURES 20 and 21. In order to provide for repositioning of the axis of these two gears and thus for proper meshing of gear 142 with gear 140 and of gear 141 with gear 143, provision is made for mounting the axis of the gear unit 141–142 in a different position, as compared with the position of FIGURES 20 and 21. For this purpose another axis mounting bore is provided in the deck 48, this additional bore being shown as being closed by a plug 145 in FIGURE 21.

By means described above it will be seen that the speed ratio from the driving gear 137 to the driven gear 138 may be changed by inversion and repositioning of the gear unit 141–142, and this provision enables the same equipment to be used at different reinforcement feed stations to provide for different speeds of helical wind as between different feed stations, even where all of such stations are driven from the same vertical shafting.

FIGURE 23 illustrates another variation obtainable with the gearing provided. In this figure there is illustrated the substitution of a gear 146 in place of the two gears 143 and 144 of FIGURES 20, 21 and 22. By substituting one double-diameter gear 146 in place of gears 143 and 144, the driven gear 138 will rotate in the opposite direction but at the same speed as the drive provided through gears 143 and 144. To accommodate this double-diameter gear, another bore is provided in the deck 48, this bore being shown as closed by a plug 147 in FIGURE 21. Thus, the gearing makes possible drive of the turntable of a helical reinforcement winding unit in either direction and at either of two speeds in either direction. This provision makes possible drive of several different reinforcement feeding units at different speeds and/or in different directions from a given sectionalized vertical drive shaft. FIGURES 4 and 4a illustrate drive of two helical strip feeding stations from shafting 132 in opposite directions but at the same speed, both of these stations being driven from shafting 132. Comparison of FIGURES 8 and 8a similarly illustrates the drving of two helical roving feeding stations in opposite directions but at the same speed from shafting 131. Many other alternative arrangements are also provided for, as will be clear from the above description of FIGURES 20 to 23.

*Alternative positioning of parts*

In considering certain of the advantages of the arrangement above described attention is directed to FIGURES 1a and 1b, each of which illustrates certain alternative positioning and assembly of reinforcement feeding devices, as compared with the arrangement and assembly of FIGURE 1.

In FIGURE 1a the arrangement of the reinforcement feeding stations includes a station at the top for the longitudinal feed of strip material from supply rolls 89a, this being followed by two stages of helically wound rovings, preferably of opposite hand from supply reels 75a, after which a layer or ply of rovings 58 is applied longitudinally, and finally another ply of longitudinal strips from another set of rolls 89a. It will be understood that all of the detailed parts of the various stages or feed devices as illustrated in FIGURE 1a will be the same as those disclosed in various of the FIGURES 2 to 23 inclusive, many of such details being omitted from FIGURE 1a for the sake of simplicity and clarity of illustration. In the case of the uppermost longitudinal strip feed, the guide cone 148 surrounding the core tube 35 is desirably of somewhat smaller exit diameter than the corresponding guide cone 97 which is provided for the longitudinal strip feed at the bottom of FIGURE 1a and also toward the bottom of FIGURE 1. The reason for this difference is that in the assembly of FIGURE 1a the uppermost reinforcement strips are the first reinforcement elements applied to the core and these should be delivered into intimate contact with the core in order to provide for effective impregnation thereof by the resin being delivered to the core tube at about that level and also because the immediately subjacent feed station provides for helical wind of rovings upon the core.

Another example of a pattern for assembly of the parts and of introduction of reinforcement elements into the article being formed is illustrated in FIGURE 1b. Here the initial ply is made up of longitudinal rovings as in the initial ply of FIGURE 1, and this is followed directly by two plies of helically wound rovings from supply spools 75a preferably of opposite hand, and finally a second longitudinal roving ply is utilized at the outer surface of the piece being made.

Many other arrangements of the parts may be utilized, according to the particular reinforcement characteristics desired in article sto be made for various different purposes.

It will be noted that in all of the arrangements of FIGURES 1, 1a and 1b, longitudinal reinforcement elements are applied immediately adjacent to the core and also as the outermost ply, any helically wound rovings or strips being arranged intermediate the longitudinal elements at the inside and at the outside of the piece. Although this may not be essential in all cases, it is of advantage, because the longitudinally applied elements manifest an appreciable tensile strength as compared with the helically wound plies, and this is of importance in avoiding breakage during the formation of the piece in the forming device and especially under the influence of the pulling thereof by the puller mechanism, which grips the piece on its outside surface at a point below the discharge end of the forming passage. Since it is contemplated that the bulk of the impregnated reinforcement which is delivered to the entrance end of the forming passage be sufficient to result in compression of the impregnated reinforcement, the article is actually formed and cured in the forming device under some compression, which is desirable from the standpoint of accuracy of cross sectional shape and soundness of the product. However this condition of the operation is such as to require substantial pull by the puller mechanism, especially in the event of pieces of large or relatively complicated cross section, and in the absence of longitudinal reinforcement elements both at the outside and inside surfaces of the tubular piece being made, these heavy pulling forces have a tendency to break the piece in the region of solidification of the resin in the forming passage.

It will be seen that the equipment and method as above described is capable of continuous production of articles, in the sense that the articles produced may be of continuous or indefinite length, and this is true regardless of whether the equipment or method is periodically or intermittently stopped or started. Indeed, it is an advantage of the invention, particularly of the synchronized operation of the puller mechanism and other driven parts of the system that it may at intervals be stopped and started if desired, without impairing the continuity of the piece being formed, and further without impairing the uniformity of the pattern or reinforcements in the article being formed.

I claim:

1. Equipment for making articles composed of fiber reinforced resin materials, comprising a forming device having a generally upright forming passage therethrough in contact with the outside surface of the article being made and in which the article is hardened and mechanism for feeding fibrous reinforcement impregnated with a hardenable liquid resin material downwardly through the forming passage, said mechanism including at least two reinforcement feeding devices arranged one above the other and adapted to feed elongated reinforcement elements into the entrance end of the forming passage, an upper of said devices incorporating means for effecting a winding motion of a reinforcement element fed thereby, means mounting said upper device above the lower device including a hollow mounting post, power means for said winding means located below a lower of said feeding devices, and power transmission means connected with the power means and extended through the hollow mounting post and connected to drive said winding means from said power means.

2. Equipment for making articles composed of fiber reinforced resin materials, comprising a forming device having a generally upright forming passage therethrough in contact with the outside surface of the article being made and in which the article is hardened and mechanism for feeding fibrous reinforcment impregnated with a hardenable liquid resin material downwardly through the forming passage, said mechanism including at least two separable reinforcement feeding devices arranged one above the other and adapted to feed elongated reinforcement elements into the entrance end of the forming passage, an upper of said devices incorporating means for effecting a winding motion of a reinforcement element fed thereby, power means for said winding means located below a lower of said feeding devices, and power transmission means for driving the winding means from the power means including a sectionalized transmission shaft having joints separable upon separation of said separable feeding devices.

3. Equipment for making articles composed of fiber reinforced resin materials, comprising a forming device having a forming passage therethrough in contact with the outside surface of the article being made and in which the article is hardened, mechanism for feeding fibrous reinforcement impregnated with a hardenable liquid resin material through the forming passage, a puller located downstream from the forming device for pulling the formed article from the discharge end of the forming passage and including a rotative actuating part, the feeding mechanism including a feeding device arranged upstream from the forming device and adapted to feed an elongated reinforcement element into the entrance end of the forming passage, the feeding device including a rotative part for effecting a winding motion of a reinforcement element fed thereby, and a synchronizing connection interrelating the operation of said rotative parts of the puller and the feeding device.

4. A construction according to claim 3 and further including means providing alternatively for different synchronized speeds of said rotative parts of the puller and the feeding device.

5. A construction according to claim 3 and further including means providing alternatively for reversed directions of rotation of the rotative part for effecting winding of the reinforcing element, as compared with the direction of rotation of the rotative actuating part of the puller.

6. Equipment according to claim 3 and further including common power means for operating the puller and the feeding device, said synchronizing connection including power transmission means interconnecting the power means with the puller and the feeding device.

7. Equipment according to claim 3 and further including means providing for relative shifting of the line of pull of the puller with respect to the reinforcement feeding device, the synchronizing connection including flexible means accommodating relative shifting of the puller and feeding device.

8. Equipment according to claim 7 and further including common power means for operating the puller and the feeding device, the power means being mounted in association with the puller, and the synchronizing connection including flexible power transmission means extended from the power means to the feeding device.

9. Equipment for making articles composed of fiber reinforced resin materials, comprising a forming device having a forming passage therethrough in contact with the outside surface of the article being made and in which the article is hardened and mechanism for feeding fibrous reinforcement impregnated with a hardenable liquid resin material through the forming passage, said mechanism including a feeding device incorporating means for effecting a winding motion of a reinforcement element helically with respect to the article being made, and a feeding device for introducing another elongated reinforcement element into the article being made outside of said helically wound element, the second mentioned element being extended axially of the direction of feed through the forming passage and near the surface of the article, together with puller mechanism adapted to grip said surface of the formed article beyond the discharge end of the forming passage and pull the article through the forming passage.

10. Equipment for making articles composed of fiber reinforced resin materials, comprising a forming device having a generally upright forming passage therethrough in contact with the outside surface of the article being made and in which the article is hardened, a core cooperating with the forming passage to define an annular passage for receiving fibrous reinforcement, the core being extended upstream from the forming device, means for delivering liquid resin material to the outside surface of the core to provide a resin-wetted core surface, mechanism for feeding fibrous reinforcements, including a device for helically winding an elongated reinforcement on the resin-wetted surface of the core in advance of the entrance end of said annular passage, and a device for applying to the core on top of the helically wound element another elongated element extended longitudinally of the forming passage and near the outside surface of the article being made.

11. Equipment for making articles composed of fiber reinforced resin materials, comprising a forming device having a generally upright forming passage therethrough in contact with the outside surface of the article being made and in which the article is hardened, a core suspended at a point spaced above the upper end of the forming device and extended downwardly into the forming passage to cooperate therewith in defining an annular forming passage for receiving fibrous reinforcement, means for feeding hardenable liquid resin material to the outside surface of the core in an upper region thereof to flow downwardly on the core by gravity, means for feeding fibrous reinforcement into contact with the resin carrying surface of the core to effect resin impregnation of the reinforcement, and means for advancing the impregnated reinforcement downwardly along the core and into said annular passage including puller mechanism engageable with the hardened article below the lower end of the forming passage and adapted to pull the formed article from the forming passage.

12. Equipment according to claim 11 and further including a resin pan surmounting the upper end of the forming device and arranged to receive excess resin flowing down the core and with the upper end of the forming passage communicating with the resin pan, and pumping means providing for recirculation of resin from said pan to the means for feeding the resin to the core.

13. Equipment according to claim 11 and further including means for cooling the core in the region of feed of fibrous reinforcement thereto.

14. Equipment according to claim 11 and further including a resin pan surrounding the core and with the annular forming passage communicating with the resin pan at the bottom thereof whereby excess resin flowing down the core is received in the resin pan, a resin chamber arranged to receive overflow from said resin pan, and pumping means for recirculating resin from said chamber to the means for feeding the resin to the core.

15. Equipment according to claim 14 and further including resin supply means delivering make-up resin into said resin chamber.

16. Equipment according to claim 15 and further including means for cooling the core in the region from the resin feed thereto to said resin pan.

17. In the making of fiber reinforced resin articles by hardening the resin in a generally vertical forming passage, the method which comprises establishing a stream of liquid heat hardenable resin material flowing downwardly on the outside surface of a core element extended from a point spaced above the upper end of the forming passage downwardly into the forming passage, feeding fiber reinforcements to the resin carrying surface of the core element to effect impregnation of the reinforcements with the resin material, feeding the impregnated reinforcements downwardly into and through the forming passage in contact therewith, heating the resin material to harden it while it is in the forming passage, and pulling on the hardened article beyond the lower end of the forming passage to draw the materials into and through the forming passage.

18. A method according to claim 17 in which the amount of resin fed in said stream is in excess of that required to fill the cross section of the forming passage when fed through the forming passage along with the fiber reinforcements, the method further including recirculating said excess resin in said stream.

19. A method according to claim 18 and further including adding make-up resin to the recirculating excess.

20. A method according to claim 17 and further including cooling the stream of resin flowing on the core.

21. In the making of fiber reinforced resin articles by hardening the resin in a generally vertical forming passage, the method which comprises establishing a stream of liquid heat hardenable resin material flowing downwardly on the outside surface of a core element extended from a point spaced above the upper end of the forming passage downwardly into the forming passage, feeding fiber reinforcements to the resin carrying surface of the core element to effect impregnation of the reinforcements with the resin material, the reinforcements fed to the core comprising at least three plies the innermost and outermost of which comprise elongated reinforcement elements extended substantially longitudinally of the direction of feed through the forming passage and an intermediate ply of which includes at least one elongated element helically wound around the core, feeding the impregnated reinforcements downwardly into and through the forming passage in contact therewith, heating the resin material to harden it while it is in the forming passage, and pulling on the hardened article beyond the lower end of the forming passage to draw the materials into and through the forming passage.

22. A method according to claim 21 in which the outermost ply of reinforcement elements includes at least one strip of fibrous material curved edgewise around the core.

23. Equipment for making articles composed of fiber reinforced resin materials, comprising a forming device having a forming passage therethrough in contact with the outside surace of the article being made and in which the article is hardened, means for impregnating fiber reinforcements with hardenable liquid resin material and for feeding impregnated reinforcements into the entrance end of the forming passage, frame structure for mounting the forming device and the reinforcement impregnating and feeding means, a puller mechanism including opposed pairs of gripping elements engageable with the formed article beyond the discharge end of the forming passage and driven so as to pull the formed article through the forming passage, a frame for mounting the gripping elements of the puller mechanism, and means mounting the puller frame on said frame structure including a ball and socket joint providing freedom for change in angular position of the puller mechanism with respect to the forming device.

24. Equipment according to claim 23 in which the means for impregnating and feeding the fiber reinforcement includes a feeding device for an elongated reinforcement element and having means for effecting a winding motion of the reinforcement element fed thereby, the equipment further including a power means for driving the puller mechanism mounted on and movable with the puller frame, and a synchronizing driving connection between said power means and the means for effecting a winding motion of said elongated reinforcing element, the driving connection including flexible means for accommodating angular motion of the puller frame relative to the frame structure on which the means for impregnating and feeding the reinforcement is mounted.

25. Equipment according to claim 23 and further including means provided for shifting movement of the puller frame with respect to the flexible joint connecting the puller frame to the frame structure in at least one direction transverse to the line of pull by the puller mechanism.

26. Equipment for making elongated articles composed of fiber reinforced resin materials, comprising a structural tower made up of sectionalized post supports and platform members, the sectionalized post supports establishing different support spacings for platform members, and the platform members carrying reinforcement feed devices of a plurality of types adapted to be interchanged between different vertical positions along the sectionalized post supports, at least one of the feed devices including means for effecting a winding motion of a reinforcement element about the axis of the article being made, and at least one of the sectionalized post supports being hollow, together with drive means for said winding means extended through the hollow post support.

27. Equipment according to claim 26 in which at least one of the feed devices includes means for feeding a reinforcement axially of the article being made, the supporting post sections associated with the feed device for axial feed of reinforcement also being hollow and having driving means therein providing for drive of the reinforcement winding means regardless of the relative positioning of the feed devices along the sectionalized post supports.

28. Equipment for making articles composed of fiber reinforced resin materials, comprising a forming device having a forming passage therethrough in contact with the outside surface of the article being made and in which the article is hardened, a core cooperating with the forming passage to define an annular passage for receiving fibrous reinforcement, mechanism for feeding fibrous reinforcement impregnated with a heat hardenable liquid resin material into the annular passage including a feed device for a fibrous reinforcement strip, the strip feed device including a turntable rotative about the axis of the core and adapted to carry a supply of reinforcement strip, reversible drive means for alternatively rotating said turntable in either direction, and a guide for directing the strip at an angle toward the core, said guide having a guiding surface lying substantially in a radial plane containing the axis of the core to provide alternatively for feed of the reinforcement strip tangentially to either side of the core.

29. Equipment for making articles composed of fiber reinforced resin materials, comprising a forming device having a forming passage therethrough in contact with the outside surface of the article being made and in which the article is hardened, a core cooperating with the forming passage to define an annular passage for receiving fibrous reinforcement, mechanism for feeding fibrous reinforcements impregnated with a heat hardenable liquid resin material into the annular passage including a feed device for a fibrous roving, the roving feed device including a turntable rotatable about the axis of the core and adapted to carry a supply of roving, reversible drive means for alternatively rotating said turntable in either direction, and guide elements adapted for alternative threading of the roving into tangency with either side of the core.

30. Equipment for making articles composed of fiber reinforced resin materials, comprising a forming device having a forming passage therethrough in contact with the outside surface of the article being made and in which the article is hardened, a core cooperating with the forming passage to define an annular passage for receiving fibrous reinforcements, mechanism for feeding fibrous reinforcements impregnated with a heat hardenable liquid resin material into the annular passage including a feed device for a fibrous roving, the roving feed device including a turntable rotatable about the axis of the core and adapted to carry a supply of roving, a guide for directing the roving tangentially to the core, means for applying tension to the roving as it is fed to the core, and means associated with said guide and responsive to fluctuations of roving pressure thereon to regulate the tension applying means in a sense to minimize fluctuations of tension.

31. Equipment for making elongated articles composed of fiber reinforced resin materials, comprising a structural tower made up of sectionalized post supports and platform members carrying reinforcement feed devices at different elevations, a forming device rigidly mounted on said tower structure below the reinforcement feed devices and having a forming passage extended generally vertically to receive the reinforcements at its upper end, and a puller mechanism including gripping elements for pulling the formed article downwardly from the lower end of the forming passage, the puller mechanism being connected with the tower by a joint provided for shifting thereof with respect to the forming device and the puller mechanism depending from that joint.

32. Equipment for making articles composed of fiber reinforced resin materials, comprising a forming device having a forming passage therethrough in contact with the outside surface of the article being made and in which the article is hardened, a core cooperating with the forming passage to define an annular passage for receiving fibrous reinforcement, mechanism for feeding fibrous reinforcements impregnated with a heat hardenable liquid resin material into the annular passage, including a device for delivering fibrous reinforcement to the core upstream from the annular passage, means for feeding a stream of liquid resin material to the core upstream from the annular passage to impregnate the fibrous reinforcement on the core before entry into the annular passage, a puller mechanism for pulling the hardened article from the forming passage, and a resin feeding pump for delivering resin to the feeding means, the pump being driven in synchronous relation to the puller mechanism.

33. A method for making elongated articles composed of fiber reinforced resin material in equipment in which a core extends downwardly into a forming passage to provide a generally upright annular forming channel, which method comprises establishing a stream of liquid heat hardenable resin material flowing downwardly on the surface of the core from a region above the forming passage to the entrance end thereof, laying fiber reinforcement on the resin carrying surface of the core to effect resin impregnation of the reinforcement and feeding the impregnated reinforcement downwardly with respect to the core and into said annular forming channel, the quantity of liquid resin fed to the core being in excess of that needed to impregnate the reinforcement and fill said annular channel, collecting said excess resin at the entrance end of the forming passage and returning said collected excess to said stream, heating the resin in the forming passage to solidify the article therein, and pulling on the solidified article beyond the discharge end of the forming passage to advance the resin material and reinforcement into and through said annular channel.

34. In the making of fiber reinforced resin articles by hardening the resin in a forming passage in contact with and between an external forming device and a cooperating internal core projecting upstream from the forming device, the method which comprises coating the external upstream portion of the core with a liquid heat hardenable resin, feeding fiber reinforcement to the coated external surface of the core at a point upstream from the forming device to effect impregnation of the reinforcement with the liquid resin, the quantity of liquid resin applied to the core being in excess of that quantity which when taken with the fiber reinforcement being fed would fill the forming passage, feeding the impregnated reinforcement downstream into and through the forming passage and thereby expelling excess liquid resin from the reinforcement, recirculating the expelled excess resin to an upstream portion of the core, and heating the resin in the forming passage to solidify the resin therein.

References Cited by the Examiner

UNITED STATES PATENTS

| | | | |
|---|---|---|---|
| 2,751,320 | 6/1956 | Jacobs et al. | 156—441 X |
| 2,778,404 | 1/1957 | Macy et al. | 156—180 |
| 2,782,833 | 2/1957 | Rusch | 156—425 |
| 2,871,911 | 2/1959 | Goldsworthy et al. | 156—441 X |
| 2,887,721 | 5/1959 | Blanchi et al. | 18—14 |
| 2,918,104 | 12/1959 | Scott et al. | 156—180 |
| 2,977,630 | 4/1961 | Bazler | 18—4 |
| 3,032,461 | 5/1962 | Baker et al. | 156—432 X |
| 3,068,134 | 12/1962 | Cilker et al. | 156—381 X |

EARL M. BERGERT, *Primary Examiner.*

P. DIER, *Assistant Examiner.*